(12) United States Patent
Herzfeld et al.

(10) Patent No.: US 6,254,154 B1
(45) Date of Patent: Jul. 3, 2001

(54) HOLE DIGGING TOOL

(75) Inventors: Richard W. Herzfeld, Milwaukee;
John E. Puhl, Richfield, both of WI (US)

(73) Assignee: Victorian Postman Limited, L.L.C., Milwaukee, WI (US)

( * ) Notice: Subject to any disclaimer, the term of this patent is extended or adjusted under 35 U.S.C. 154(b) by 0 days.

(21) Appl. No.: 09/577,852

(22) Filed: May 24, 2000

(51) Int. Cl.[7] .................................................. A01B 1/22
(52) U.S. Cl. ............................................. 294/53.5; 294/58
(58) Field of Search ........................... 294/49, 50.8, 50.9, 294/51, 53.5, 57, 58; 15/257.7; 172/371, 372

(56) References Cited

U.S. PATENT DOCUMENTS

| | | | |
|---|---|---|---|
| 29,153 | * 7/1860 | Fiester | 294/53.5 |
| 462,043 | * 10/1891 | Gibbs | 294/53.5 |
| 815,133 | * 3/1906 | Van de Walker et al. | 294/50.9 |
| 835,994 | * 11/1906 | Wall | 294/53.5 |
| 1,128,137 | * 2/1915 | Hepp | 294/53.5 |
| 1,182,724 | * 5/1916 | Waldorf | 294/53.5 |
| 1,183,277 | * 5/1916 | Collins | 294/53.5 |
| 5,826,929 | * 10/1998 | Tisbo et al. | 294/57 X |

FOREIGN PATENT DOCUMENTS

| | | | |
|---|---|---|---|
| 739454 | * 10/1955 | (GB) | 294/53.5 |
| 1200663 | * 7/1970 | (GB) | 294/53.5 |

* cited by examiner

Primary Examiner—Johnny D. Cherry
(74) Attorney, Agent, or Firm—Ryan Kromholz & Manion, S.C.

(57) ABSTRACT

An improved digging tool for digging holes and the like. A shovel is pivotally attached to a handle shaft and includes an improved primary lever mechanism and a secondary lever mechanism.

6 Claims, 3 Drawing Sheets

HOLE DIGGING TOOL

BACKGROUND OF THE INVENTION

Various specialized tools for digging holes and the like are known to gardeners and landscape workers. Often, when an application is small, it is more efficient to use a hand-operated tool rather than bringing in a large, power tool to the work site. This is particularly true when a small property owner wishes to install a fence wherein a limited number of post holes are needed. Rather than renting or buying a mechanical auger, a hand tool is often a more viable solution. However, hand tools currently used for post hole digging are frequently clumsy to use, unduly taxing on the user, and inefficient in operation. A tool exhibiting some of these shortcomings is the scissors-type digger wherein two shovel blades, affixed to respective handles, are aligned in a face-to-face orientation and pivotally connected to move clamshell style between open and closed positions. Use of a tool of this type requires the user to maintain the closed position as excess soil is removed from the hole being dug. This may lead to upper body fatigue as well as inefficient soil removal as user fatigue loosens the closed blades and soil falls back into the freshly dug hole. Further, it is difficult to maintain a uniform hole diameter as the hole is dug deeper. Auger type diggers create a more uniform hole diameter, but still create difficulties for soil removal and fatigue as the user is required to exert rotational movement along the handle length. By way of background, it is presently believed that the shovel pivot tool, manufactured and sold by the assignee of the present invention, and commercially known as the "Pit Boss" is the closest related art reference. This tool provides a solution to a number of the shortcomings present in the aforementioned devices, namely, increased fatigue, non-uniformity of hole diameter, and inefficient soil removal. This device includes a shovel-type blade pivotally attached to a main shaft or handle. The device also includes a lever arm hingedly attached to the shovel such that when the shovel and lever arm are positioned on the ground in digging position, the lever arm is parallel to the main handle shaft.

SUMMARY OF THE INVENTION

The present invention provides a solution to the problems associated with the devices mentioned above, namely user fatigue, lack of uniformity of hole size throughout its depth, and difficulty of use. The present invention further provides an improvement for a hole digging tool of the pivot type. The tool comprises a ground-penetrating portion, such as a shovel, pivotally attached to a conventional handle shaft. The shovel blade preferably includes two upturned portions and is further pivotally attached to an inverted, Y-shaped, movable shaft. The arms of the Y-shaped shaft each respectively pivotally attach to an upturned portion of the shovel, while the leg of the shaft runs parallel to and substantially coextensive with a portion of the handle shaft length. The improvement comprises the addition of a secondary lever mechanism and handle. This addition allows the user to gain added leverage over the shovel. Additionally, the user gains an additional lift surface when lifting the material-laden shovel from a hole. Furthermore, the present invention provides an improved primary lever mechanism, whereby movement of the main lever handle causes all linked components to move in parallel, causing the moving ratio to be 1:1.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
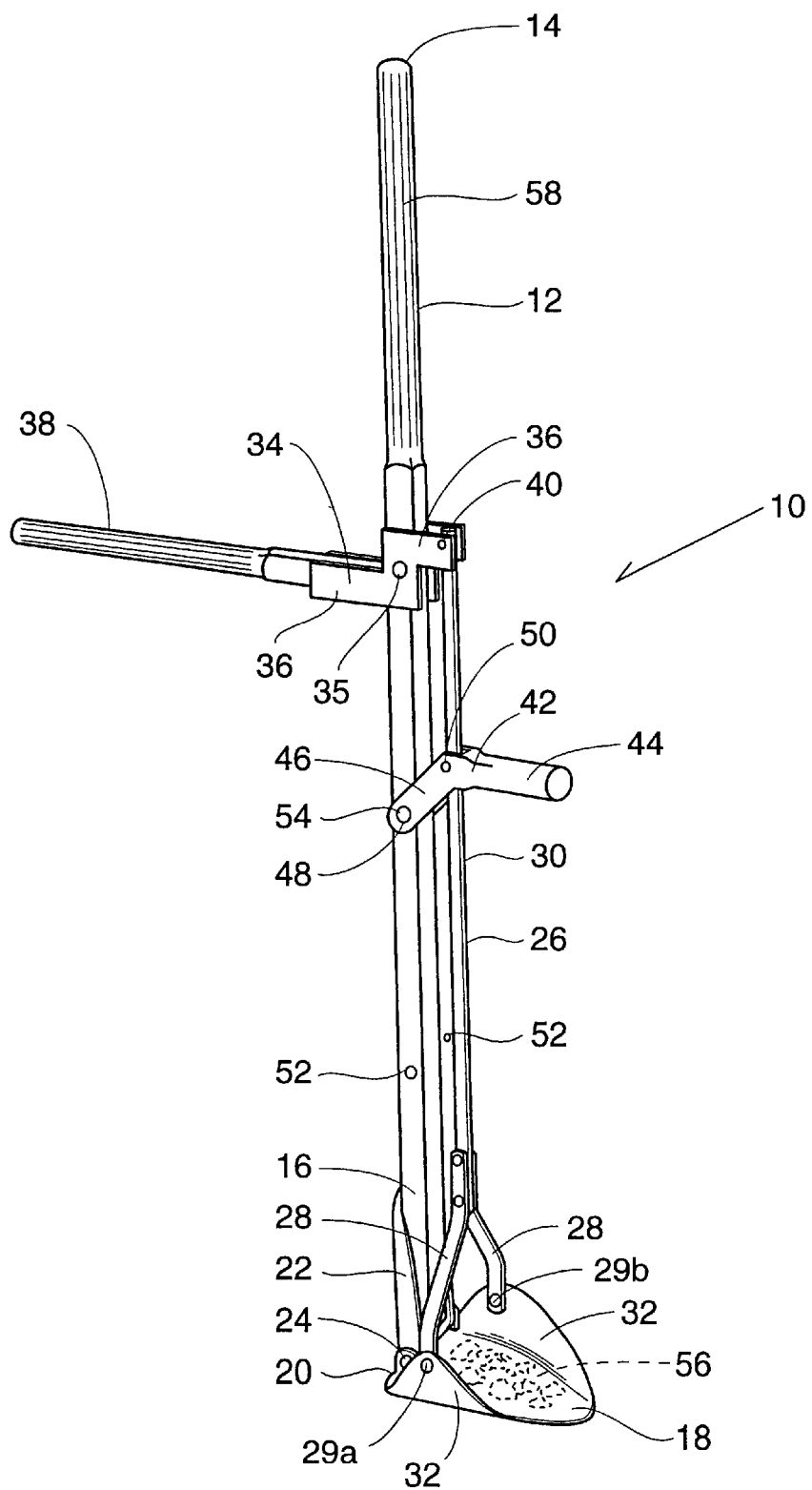
FIG. 1 is a perspective view of the hole digging tool of the present invention.
Figure 2:
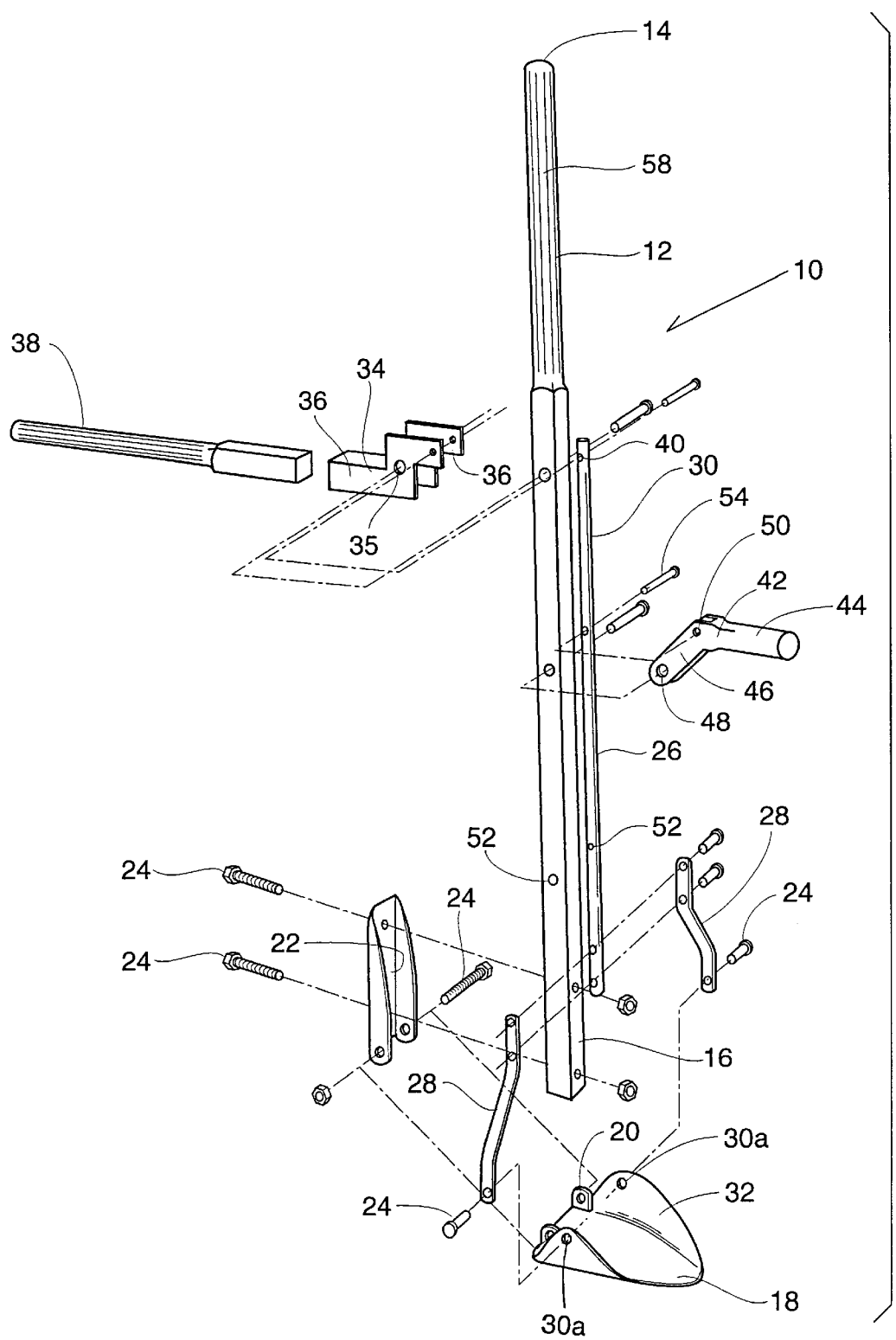
FIG. 2 is an exploded view of the hole digging tool of FIG. 1.

The preferred embodiment of the improved hole digging tool, indicated generally by the reference numeral 10, may be seen in the views of FIGS. 1–3c, inclusive. In the preferred embodiment, the hole digging tool 10 includes an elongated shaft or primary handle member 12, having a distal end 14 and a working end 16, and a digging member 18 (seen as a shovel in these views). The handle may be fabricated from wood, or may be made from any other substance such as fiberglass-filled resin, or other known materials having sufficient strength for digging and lifting. The digging member 18 is pivotally attached to the working end 16 of the primary handle member 12 by way of a movable hinge member 20. The hinge member 20 may further include an upstanding backplate 22 which is secured to the handle member 12 by way of conventional bolts 24. The backplate 22 provides added stability and strength to the hinge member 20 and assists the shovel 18 in retaining dirt or debris 56 while lifting out of a hole (not shown). The improved digging tool 10 is further provided with a secondary, movable shaft 26. The secondary, movable shaft 26 is Y-shaped and includes two arm portions 28 and an elongated leg portion 30. Each arm portion 28 is pivotally connected to the digging member 14 at respective pivotal points 29a, 29b by way of conventional attachment means such as bolts or screws 24. The digging member (i.e. shovel 18), back plate 22, and secondary shaft 26 may be forged or stamped from sheet steel or the like. As seen in FIGS. 1 and 2, the digging member 18 may be provided with two upturned portions 32, having apertures 30a (shown in FIG. 2) to provide an attachment surface for the arm portions 30 of the secondary shaft 26, and to further allow the digging member 18 to carry debris 56, such as soil (shown in phantom) out of the digging area. A primary lever mechanism 34, including two oppositely disposed lever arms 36, is pivotally attached to the handle member 12 at a pivot point 35, intermediate the ends 14, 16. The primary lever mechanism 34 further includes a handle portion 38 extending from and secured to one of the oppositely disposed lever arms 36. Handle portion 38 may include radially spaced, longitudinal grooves 58 to provide additional gripping elements. The other of the oppositely disposed lever arms is pivotally secured to the distal end 40 of the elongated leg portion 30 of the secondary, movable shaft 26, such that as the handle portion 38 rotates clockwise upwardly relative to FIG. 1, and relative to the primary handle 12, the distal end 40 of the secondary shaft 26, moves downward relative to the primary handle 12.

The improved hole digging tool 10 is further provided with a secondary lever mechanism 42. The secondary lever mechanism 42 includes an integrally formed handle portion 44 and an angled lever arm 46. The secondary lever mechanism 42 is pivotally attached to the primary handle 12 at pivot point 48 and the secondary shaft 26 at pivot point 50, at a predetermined placement intermediate the digging member 18 and the primary lever mechanism 34. In the preferred embodiment of the present invention, the secondary lever mechanism 42 is arranged to be located at any of a plurality of predetermined locations 48, 52 located along the primary handle 12 and secondary shaft 26. This allows the user to secure the secondary lever mechanism 42 at a location suitable for the hole to be dug. For example, if the hole desired is to be rather deep, the user may place the secondary lever 42 at a point closer to the distal end 14 of the primary handle 12. This way, the user may insert the tool 10 into a deep hole while continuing to access the handle portion 44 of the secondary lever 42. The secondary lever 42 and handle portion 44 afford the user additional leverage while moving the soil to be removed, while the handle portion 44 further aids the user by supplying an additional lift surface when removing the debris-laden tool 10 from a hole. To allow the flexibility of multiple attachment points, both the primary handle 12 and secondary shaft 26 are provided with a plurality of attachment points, seen as screw-receiving holes 52. As shown in the Figures, the secondary lever mechanism 42 is preferably releasably attached to the primary handle 12 and secondary movable shaft 26 by way of conventional threaded bolts 54.

Figure 3A:
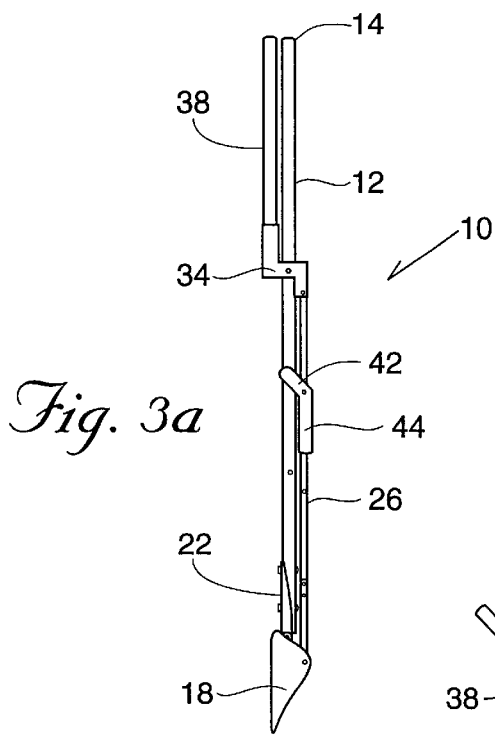
FIG. 3a is a side elevational view of the hole digging tool and showing the lever handles and shovel in generally parallel alignment with the handle shaft, in position ready to commence digging.

Seen particularly in FIG. 3a, is the improved hole digging tool 10 in an initial operating position. The primary lever mechanism 34 and secondary lever mechanism 42 with their handles 38 and 44 are in parallel relationship with the primary handle 12. The digging member 18 is extended and ready for use.

Figure 3B:
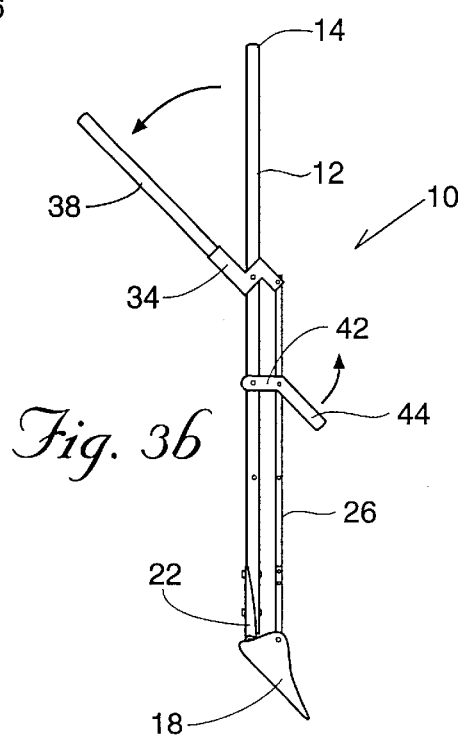
FIG. 3b is a side elevational view of the hole digging tool and showing the lever handles and shovel in an intermediate position.

With reference to FIG. 3b, the tool 10 is shown at an intermediate step in the digging process. Here, the lever mechanisms 34 and 42 with digging member 18, are shown partially rotated around their respective pivot points, 29a, 29b, 35, 48, and 50 and wherein the lever handles 38, 44 are rotated counter-clockwise relative to FIG. 3b and in the direction of the arrows. FIG. 3b particularly shows the tool 10 prior to being lifted out of a hole in process (not shown) but after a load of dirt or other matter to be removed has been loosened.

Figure 3C:
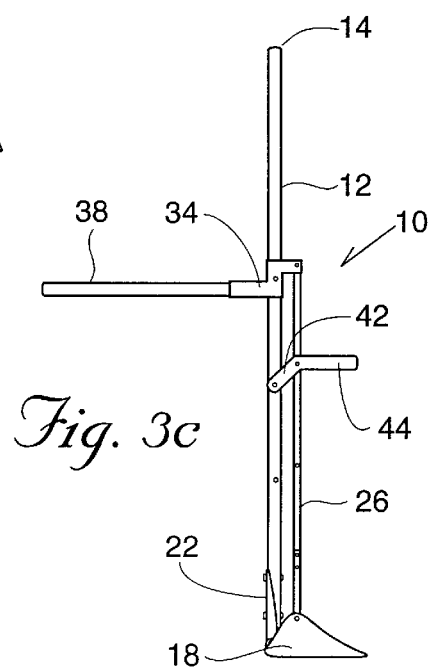
FIG. 3c is a side elevational view of the hole digging tool and showing the lever handles and shovel in perpendicular relation to the handle shaft, in position to move matter from one level to another.

FIG. 3c illustrates the improved tool 10 in its lifting position. Here, the lever mechanisms 34 and 42 are rotated to a position perpendicular to the primary handle 12. The digging member 18 is also rotated to a position substantially perpendicular to the primary handle 12, such that as the tool is lifted from the hole-in-process, the debris 56 to be carried out rests on the rotated digging member 18.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. In a hole digging tool comprising:
an elongated shaft having two ends;
an elongated operating rod having a distal end and an attachment end;
a shovel member pivotally attached to one of said ends of said shaft at a first shovel pivot point, said shovel member being further pivotally attached to said attachment end of said operating rod at a second shovel pivot point, said first and second shovel pivot points being spaced apart at a predetermined distance;
a first lever mechanism including first and second pivot points, said first and second pivot points being spaced apart at a predetermined distance, said first lever mechanism being pivotally attached intermediate the ends of said shaft at said second pivot point;
said first lever mechanism including first and a second oppositely disposed lever arms, the first of said lever arms including an elongated handle member extending from said lever arm, said elongated handle member being secured to said first lever arm, and in its intial operating position, said elongated handle member extending laterally relative to said shaft and being arranged to be pivotally moved to an upright position relative to said shaft, second of said lever arms being pivotally attached at said first pivot point to said elongated operating rod, the improvement comprising:
a secondary lever mechanism including first and second oppositely disposed lever arms, said secondary lever mechanism including a first pivot point, said secondary lever mechanism being pivotally attached to and located intermediate the ends of said elongated operating rod at said first pivot point, the first of said lever arms of said secondary lever mechanism including a second pivot point, said first lever arm being pivotally attached to said elongated shaft at a predetermined point located between said shovel member and the pivot point of said first lever mechanism, and the second of said lever arms being pivotally attached and extending laterally from said elongated operating rod at said first pivot point, said first and second pivot points of said secondary lever mechanism being spaced apart at a predetermined distance equal to said predetermined distance of said first and second pivot points of said first lever mechanism and said first and second shovel pivot points to provide a 1:1 moving ratio between said lever mechanisms and said shovel.

2. The improved digging tool of claim 1 wherein said elongated operating rod is Y-shaped and defines two arm members at the attachment end of said elongated operating rod and a leg member at the distal end of said elongated operating rod.

3. The improved hole digging tool of claim 2 wherein said arm members are each respectively pivotally attached to said shovel member at pivot points laterally spaced from the pivotal attachment with said operating rod.

4. The improved hole digging tool of claim 2 wherein said shovel member includes at least one upturned portion.

5. The improved hole digging tool of claim 1 wherein said shovel member includes at least one upturned portion.

6. The improved hole digging tool of claim 1 wherein said elongated handle member and said elongated shaft are each provided with radially spaced longitudinal grooves defining gripping elements.

* * * * *